United States Patent
Damola

(10) Patent No.: US 9,295,070 B2
(45) Date of Patent: Mar. 22, 2016

(54) QUALITY OF SERVICE LEVEL ADAPTATION FOR VISUAL SERVICES IN MOBILE COMMUNICATION NETWORKS

(75) Inventor: Ayodele Damola, Solna (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 177 days.

(21) Appl. No.: 14/115,432

(22) PCT Filed: May 9, 2012

(86) PCT No.: PCT/EP2012/058588
§ 371 (c)(1),
(2), (4) Date: Nov. 4, 2013

(87) PCT Pub. No.: WO2012/152850
PCT Pub. Date: Nov. 15, 2012

(65) Prior Publication Data
US 2014/0086151 A1    Mar. 27, 2014

Related U.S. Application Data

(60) Provisional application No. 61/483,904, filed on May 9, 2011.

(51) Int. Cl.
H04W 72/08    (2009.01)
H04W 28/16    (2009.01)

(52) U.S. Cl.
CPC .......... *H04W 72/087* (2013.01); *H04W 28/16* (2013.01)

(58) Field of Classification Search
CPC .................. H04W 28/16; H06F 17/30244
USPC ..................................................... 370/328
See application file for complete search history.

(56) References Cited

U.S. PATENT DOCUMENTS

| 9,020,966 B2* | 4/2015 | Erol et al. ............ 707/769 |
| 2007/0025359 A1* | 2/2007 | Andriantsiferana et al. .......... 370/395.21 |
| 2010/0161802 A1* | 6/2010 | Tofighbakhsh et al. ....... 709/226 |

FOREIGN PATENT DOCUMENTS

| WO | 2012052064 A1 | 4/2012 |
| WO | 2012052067 A1 | 4/2012 |

OTHER PUBLICATIONS

Marimon, et al., "Mobile Visual Recognition, the future of Mobile AR", Telefonica Investigacion y Desarrollo, Mobile AR Summit @ Mobile World Congress 2010, 2010, 2 pages.
Tsai, et al., "Fast Geometric Re-Ranking for Image-Based Retreival", ICIP 2010, pp. 1029-1032.

* cited by examiner

*Primary Examiner* — Ian N Moore
*Assistant Examiner* — Mewale Ambaye
(74) *Attorney, Agent, or Firm* — Patent Portfolio Builders, PLLC

(57) ABSTRACT

The invention refers to a method for performing a visual service associated to a mobile user equipment—UE—(10) in a communications network, the communications network comprising a mobile network (20), the method comprising receiving (S2) at a service node (30) within the mobile network (20) a message indicative of a request of the UE (10) associated to the visual service, obtaining the network address of the UE (10), and initiating an adaptation of a quality of service—QoS—level for a treatment of data traffic associated with the visual service between the UE (10) and the mobile network (20). The invention further relates to a service node (30) adapted for performing the method and a computer program loadable into the service node (30).

11 Claims, 8 Drawing Sheets

QUALITY OF SERVICE LEVEL ADAPTATION FOR VISUAL SERVICES IN MOBILE COMMUNICATION NETWORKS

CROSS REFERENCE TO RELATED APPLICATION(S)

This application is a 35 U.S.C. §371 National Phase Entry Application from PCT/EP2012/058588 filed May 9, 2012, which claims priority to U.S. provisional patent application No. 61/483,904 filed on May 9, 2011. The above identified applications are incorporated by reference in their entirety.

TECHNICAL FIELD

The present invention generally relates to visual communication services in mobile communication networks, specifically to visual search and augmented reality services, and more specifically to ensuring quality of service related to such services

BACKGROUND

Visual communication services with respect to mobile communication devices are gaining increasing importance. One of such services is the so-called visual search, wherein by using a camera (e.g. integrated within a mobile phone or any suitable terminal), an image of a physical object is captured and corresponding data is sent to the network that recognizes the image by means of suitable computer algorithms and returns useful information back to the user about the physical object.

The aim of visual search is primarily to identify the physical object and thereby present the user with associated information. This information, also being referred to as metadata, might be of various formats e.g. video files, audio files, web pages, images animation files etc.

When the input data to an algorithm is too large to be processed and it is suspected to be notoriously redundant (much data, but not much information), the input data will be transformed into a reduced representation set of features (also named features vector). Transforming the input data into the set of features is called feature extraction. If the features extracted are carefully chosen it is expected that the features set will extract the relevant information from the input data in order to perform the desired task using this reduced representation instead of the full size input.

Most current visual search systems adopt the so-called feature based image matching approach. By representing images or objects using sets of local features, recognition can be achieved by matching features between the query image and candidate database image. Fast large-scale image matching is enabled using so-called vocabulary trees (VT). Features are extracted from the database of images and a hierarchical clustering algorithm is applied to all of these features to generate the VT. Descriptors of the query image are also classified through the VT and a histogram of the node visits on the tree nodes is generated.

Candidate images are then sorted according to the similarity of the candidate database image histogram and a query image histogram. Image capture and feature manipulations are proposed to be performed in the mobile terminal, while VT and GV are performed on a server in the Internet.

Augmented reality (AR) is an upcoming paradigm of presenting metadata of physical objects as an overlay over the image or video of a physical object in real time. Special applications called augmented reality browsers (AR browsers) are used in terminals e.g. mobile phones and these are gaining popularity. The AR browsers perform two main functions; visual search initiation and overlay display of metadata on the end user terminal display. The AR server incorporates elements of visual search and of an overlay object server. The visual search component performs the matching of an image to the dataset and the file server performs the function of sending the corresponding overlay data to the AR browser for displaying to the end user. It should be noted that the overlay data could range from simple text to a complex webpage containing text, audio and video components. Also it may be possible for the end user to further interact with the overlay data displayed e.g. start/stop video, scroll text, enlarge image etc. Overlay data is also called metadata of the physical object and this is the term that will be used in this document. Businesses could take advantage of AR in a multitude of ways, such as personalized shopping blending location dependent information and blended branding.

Execution of the visual search algorithms in known visual search solutions is performed in the Internet, i.e. beyond the mobile network. However, communication with to Internet and execution within the internet might involve (unpredictable) transmission delays such that a reply to the user will be (unpredictably) delayed, thus adversely affecting the quality of experience (QoE). This might lead to unsatisfied users restraining from using such service, and consequently makes it difficult for visual search and AR providers to deploy such services.

SUMMARY

It is an object of the present invention to provide a certain level of QoS quality with respect to a visual service provided to a mobile user.

This object is achieved by the independent claims. Advantageous embodiments are described in the dependent claims.

In an embodiment, it is proposed to perform a visual service associated to a mobile user equipment—UE—in a communications network, the communications network comprising a mobile network by receiving at a service node of the mobile network a message indicative of a request of the UE associated to the visual service, and after obtaining the network address of the UE, initiating an adaptation of a quality of service—QoS—level, e.g. to achieve or guarantee a desired level of QoS, for a treatment of data traffic associated with the visual service between the UE and the mobile network.

In an embodiment, prior to initiating the adaptation of the QoS level, the service node communicates with a policy server, e.g. a PCRF server according to 3GPP specifications, to determine if initiating an adaptation of a quality of service—QoS—level should be performed towards the UE, e.g. to the specific UE or to the class of UE the UE belongs to, and/or to UE's within a certain area. The policy server might communicate with a gateway node of the mobile network responsible for establishing the adaptation of the quality of service—QoS—level towards the UE.

In an embodiment, prior to initiating the adaptation of the quality of service—QoS—level, an authentication is performed in order to determine if the visual service shall be provided to the UE.

In an embodiment, the adaptation of the QoS level comprises upgrading a bearer level QoS of a default bearer established between the UE and the gateway node, e.g. by changing default QoS parameters so that e.g. a certain bit rate and/or a certain maximum bit rate is guaranteed, and/or an appropriate allocation and retention priority is provided.

Alternatively or additionally to upgrading the default bearer, a dedicated bearer might be established that fulfils the QoS requirements associated to the adaptation of the QoS level.

In an embodiment, the visual service comprises receiving a visual search request comprising data indicative of an image associated to an item captured by a photo camera associated to the UE, wherein the service node performing an image recognition, and in case that the image recognition is successful, retrieving item information from one or a plurality of data servers, generating a visual search response comprising specific information with respect to the captured item to be transmitted to the UE.

In an embodiment, the one or the plurality of data servers are connected by means of a data packet network, wherein the service node is also connected to data packet network to performs a data packet network communication (e.g. an Internet Protocol—IP—communication) in order to obtain the item information.

According to an embodiment, the service node retrieves subscriber information associated to the UE from an operator data base to be used for generating the specific information in dependency of the subscriber information. The operator data base might keep stored at least one of: subscription information with respect to the visual service, subscriber preferences, subscriber status, subscriber's consent to use certain user information, information associated to previous subscriber's service requests.

In an embodiment, a request is sent (one of) the plurality of data servers, the request comprising a subscriber's preference information based on the subscriber information to obtain item information associated to the preference information. The item information received from the one or the plurality of data servers might comprise metadata information (e.g. to be displayed at a display of the UE as a visual overlay to the captured image) and/or one or a plurality of advertisement messages. Alternatively to outputting the information at the display, any other user interface, e.g. a loudspeaker of the UE might be used for outputting the information (e.g. by voice).

In an embodiment, the service node is a mobile cloud accelerator MCA performing information brokering between the UE and a variety of data being available within the mobile network and outside the mobile network available over the internet. The MCA ensures a certain level of Quality of Experience with respect to the service. This might be ensured by adapting or guaranteeing a certain level of QoS both towards the UE (i.e. in the access domain) and toward the Internet (e.g. by means of using a so-called content data network—CDN—associated to the Internet). The MCA might be run as a service, connecting a plurality of content providers with a plurality of mobile operators. Integrated into the mobile network infrastructure, it provides content and application providers to easily connect with the end-users at high and consistent quality of experience over mobile environments.

The operator is enabled to offer visual search—VS—and/or—AR—augmented reality services e.g. to those companies that are geographically located in an area where the operator has infrastructure; e.g. a local provider in a city may offer a VS and AR service to a real estate company in this city, which uses AR e.g. to advertise houses/apartments for sale.

The invention thus enables the operators to earn revenue based advertisement spot reselling of AR space to 3rd party metadata providers and advertisement providers. This is basically the ability to perform advertisement insertion based on subscriber information knowledge.

The present invention also concerns computer programs comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

BRIEF DESCRIPTION OF THE FIGURES

FIG. 6 shows a block diagram of an exemplary first variant to FIG. 3a, and FIG. 7 shows a block diagram of an exemplary second variant to FIG. 3a.

DETAILED DESCRIPTION

Figure 1:
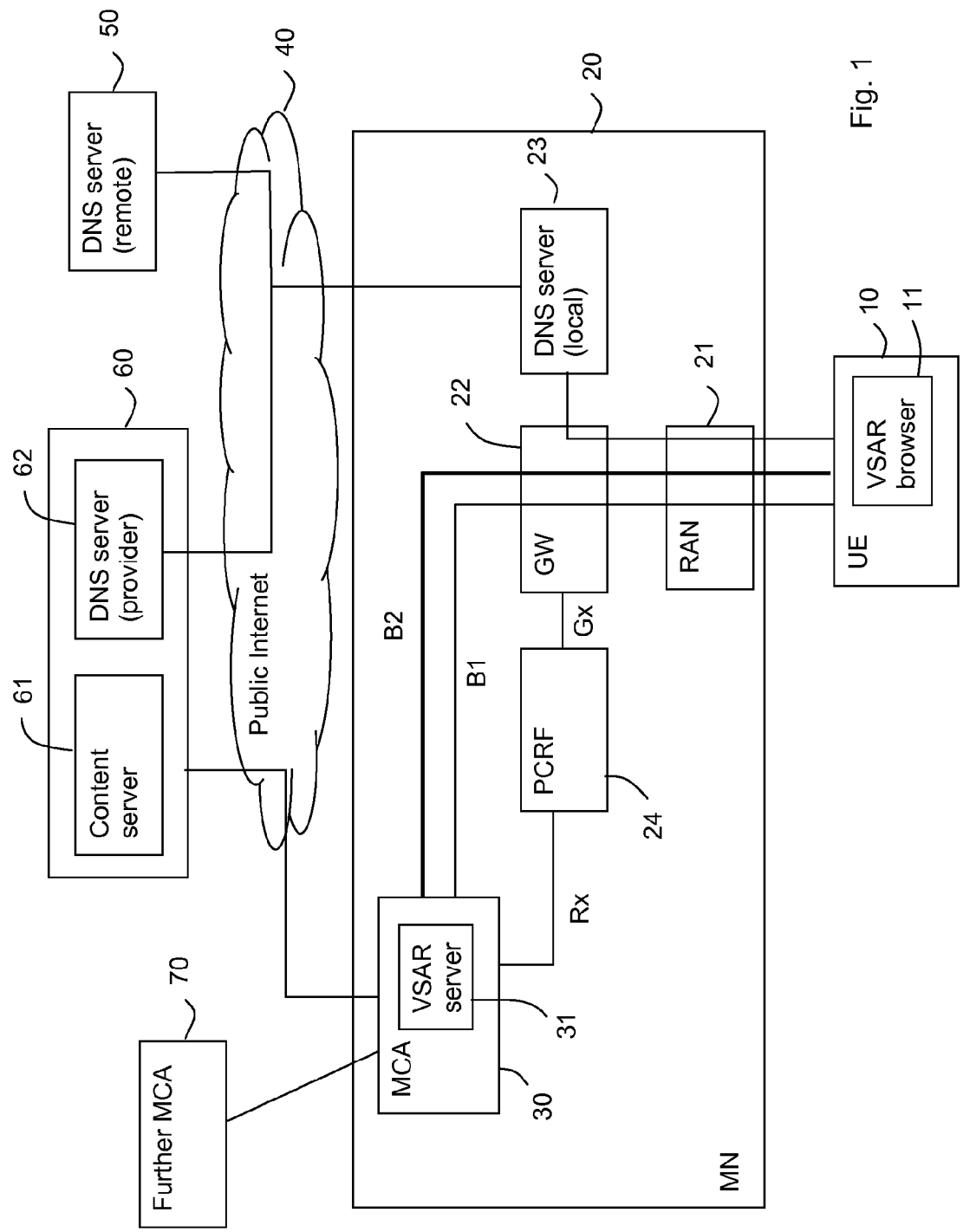
FIG. 1 shows a principle block diagram with exemplary components of a telecommunications system adapted for to provide a visual service to a UE.

FIG. 1 shows a principle block diagram with a communications network 1 and a mobile user equipment—UE—or mobile terminal 10 being connected to the communications network. The communications network comprises a mobile network 20 and a packed data network or Internet 40. The mobile network 20 exemplarily shows a radio access network 21, a gateway 22, a local DNS server 23, a policy server or controller 24, and a visual service supporting node, in the following being referred to as mobile cloud accelerator (MCA) 30. Further network components 50, 60 and 70, i.e. a remote DNS server 50, a content server 61 and a content providers DNS server 62 of an exemplary content provider equipment 60 and an exemplary further MCA 70 are coupled to the mobile network via the Internet 40.

The Radio Access Network (RAN) 21 might be based on a certain type or certain types of radio access technology, e.g. GSM (Global System for Mobile Communications), EDGE (Enhanced Data Rate for GSM Evolution), UMTS (Universal Mobile Telecommunications System) or LTE (Long Term Evolution). Although the RAN 21 is illustrated as a single node, it is to be understood that the RAN 21 may actually be formed of a number of components, which are not further explained herein. The RAN 21 is coupled to a gateway (GW) 22. The gateway 22 may be a Gateway GPRS Support Node (GGSN) providing a connection of GPRS-based services to one or more external packet data networks. The gateway 26 may also be a Packet Data Network Gateway (GW) according to the 3GPP TS. The gateway 22 thus terminates the mobile network (by means of the so-called the SGi interface) towards the internet and is thus responsible for an interworking between a mobile network and the nodes beyond the Internet.

The local DNS server 23 that collaborates with remote DNS server 50 and provider's DNS server 62 to enable the MCA 30 to get content data of the content server 61 in order to serve a visual search request from the UE 10.

The policy controller 24 might comprise a Policy and Charging Rules Function (PCRF) according to 3GPP specifications. The policy controller 24 may be realized by dedicated hardware and/or comprise software functions executed by a processor. The policy controller 24 communicates with the gateway 22 via an interface in order to provide the gateway 22 with policy information in order to enforce an appropriate policy, wherein the interface may be implemented using the Gx interface according to the 3GPP. The policy controller 24 may be further coupled to a subscription database and/or to a service policy database not shown here, e.g. implemented using the so-called Sp interface according to the 3GPP. The policy controller 24 may receive policy data relating to a specific user and/or relating to a specific service available in the mobile communication network. The policy controller 24 may further communicate with a mobile cloud accelerator—MCA—30 described in the following using an interface, which may be implemented using the Rx interface according to the 3GPP TS.

The MCA 30 is a node a system associated to the mobile network that acts as a kind of information broker between the UE 10 and a variety of data being available within the mobile network and outside the mobile network available over the internet. The MCA can be regarded as an end-to-end solution that offers a plurality of mobile communications operators and content providers a fast delivery of content and applications to end users at a certain quality of service. MCA might be run as a service, connecting a plurality of content providers with a plurality of mobile operators. Integrated into the mobile network infrastructure, it provides content and application providers to easily connect with the end-users at high and consistent quality of experience over mobile environments.

One important task of the MCA is to identify a visual service request from the UE, and in response thereto establish a certain QoS handling for further data exchange between the UE and the mobile network in order to avoid latency effects due to radio congestion.

In the following an exemplary handling will be described in more details in the following paragraph. As illustrated, service-related data traffic between the mobile network 20 and the user equipment 10 is carried by one or a plurality of bearers B1 and B2. The service-related data traffic typically pertains to one or more visual service applications running on the UE 10. The bearers B1, B2 are established between the user equipment 10 and the gateway 26 to carry data traffic in both the DL and the UL directions. The bearers may include a default bearer B1 (also being referred to as primary PDP context) generally established for offering packet-based services to the user equipment 10 and one or more dedicated bearer B2 (also being referred to as (network initialized) secondary PDP context), which may have different QoS level, e.g. a higher QoS level, than the default bearer. The default bearer B1 is typically established when the UE 10 attaches to the gateway 26. The dedicated bearer is may be established in response to a visual search registration, e.g. after a policy and/or subscription parameters are checked, e.g. by an RX communication with the policy controller 24. Accordingly, a certain QoS level may be provided for communicating data packets between the UE 10 and the gateway 22 by assigning the data packets to the dedicated bearer B2. In addition or alternatively, the QoS level desired for visual search service might be adapted by modifying an existing bearer, e.g. the default bearer B1. The MCA might supervise an activity after the dedicated bearer has been established and release a prioritized handling after a certain inactivity time, e.g. by means of an inactivity timer. Depending on a PCRF configuration, the dedicated bearer might be still kept or released as well.

Further, the MCA 30 comprises a server dedicated for a communication with a corresponding visual service application 13 within the UE. In the following this server will be referred to as visual search and augmented reality—VSAR—server 31 and the corresponding application 13 will be referred to as VSAR application 13. Thus, the VSAR server 31 is responsible for receiving queries from the VSAR application 13, and for sending corresponding replies to the VSAR application. It maintains the connection between the VSAR application and redirects UE requests to appropriate functions within or associated to the MCA 30, e.g. to an image recognition (function) 33 and the data aggregator function 34 as described later-on.

Figure 2:
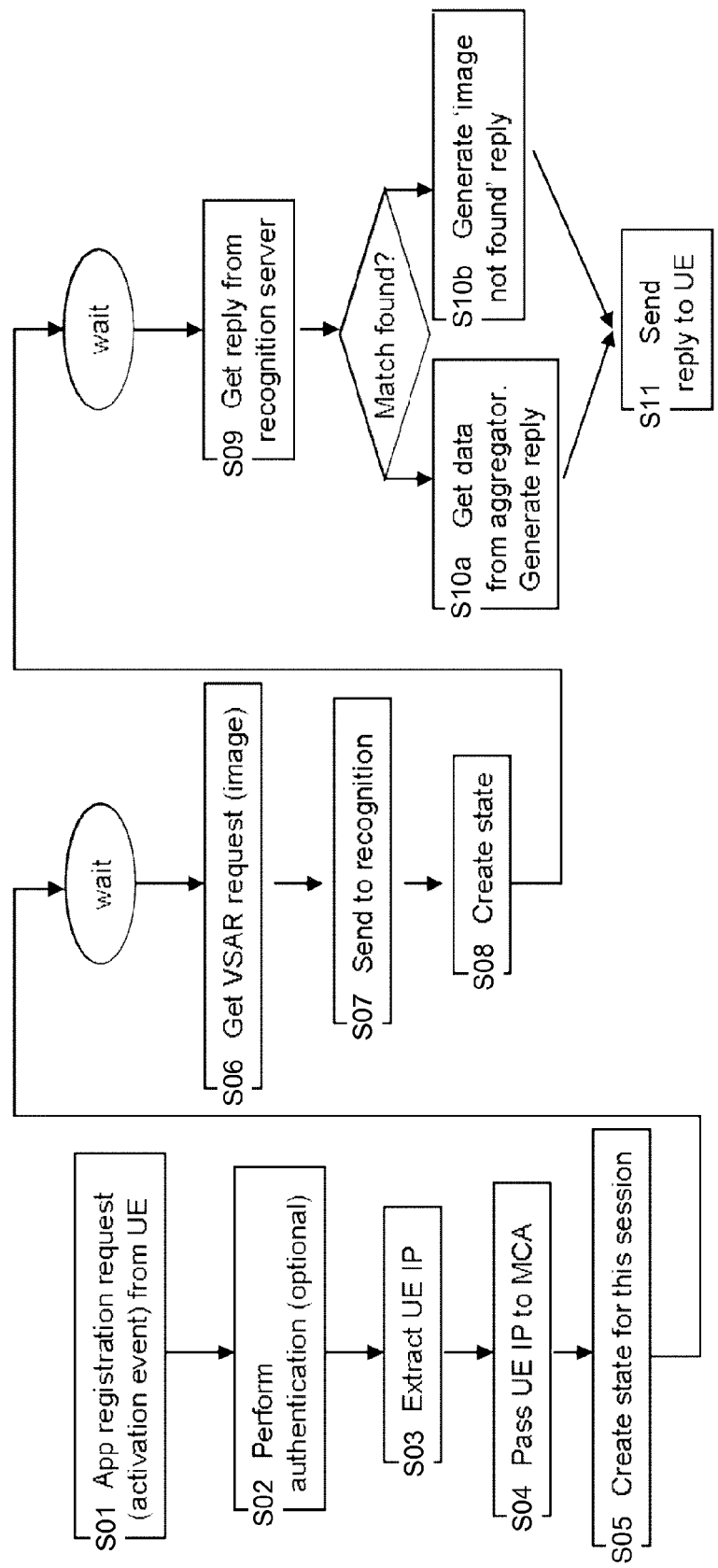
FIG. 2 shows an exemplary sequence of steps being performed by a visual service node of the telecommunications system with respect to registering to a visual service and to processing a visual service request of the UE.

In the following FIG. 2, exemplary steps being performed by the VSAR server 31 are described in more details. Therein, steps S01-S05 describe a process of registration to a VSAR service, and subsequent steps S01-S11 describe an exemplary serve request within the framework of such registration:

In a first step S01, when the VSAR application is started in the UE, it sends a registration request to VSAR server; this may be a basic message which ensures that the server is up and running, or any other (more detailed) registration message.

In a second (optional) step S02, an authentication may be performed by the server in response to a receipt of the registration message. This step may be performed to ensure that the subscriber is allowed to use the service.

In a third step S03, the IP address of the UE (UE IP) is extracted.

In a fourth step S04, the extracted UE IP is passed to the MCA to start the QoS establishment procedure. An operator policy might be applied to determine if QoS shall be initiated towards the particular subscriber.

In a fifth step S05, a state is created to be able to connect future messages from the UE with internal processes. Subsequently, the system might enter a waiting mode being ready to receive a visual service request from the UE.

In a sixth step S06, the UE transmits a VSAR request. The request might comprise the raw image data and/or feature data associated to the image.

In a seventh step S07, corresponding image and/or feature data is sent to the image recognition function.

In an eighth step S08, a state is created for the session (the system goes again into a waiting mode).

In a ninth step S09, a reply is received from the recognition system; this reply is indicative of whether a match was found or not. Depending on the result, one out of the next steps 10a or 10b is executed.

In a tenth, first alternative, step, 10a, as result of a "match", the aggregator is queried for corresponding data and a personalized reply is generated.

In a tenth, second alternative step, 10b, as result of a "miss", a "not found" reply is created.

In a last step S11, a corresponding reply is sent to the UE for display to the end user.

Figure 3A:
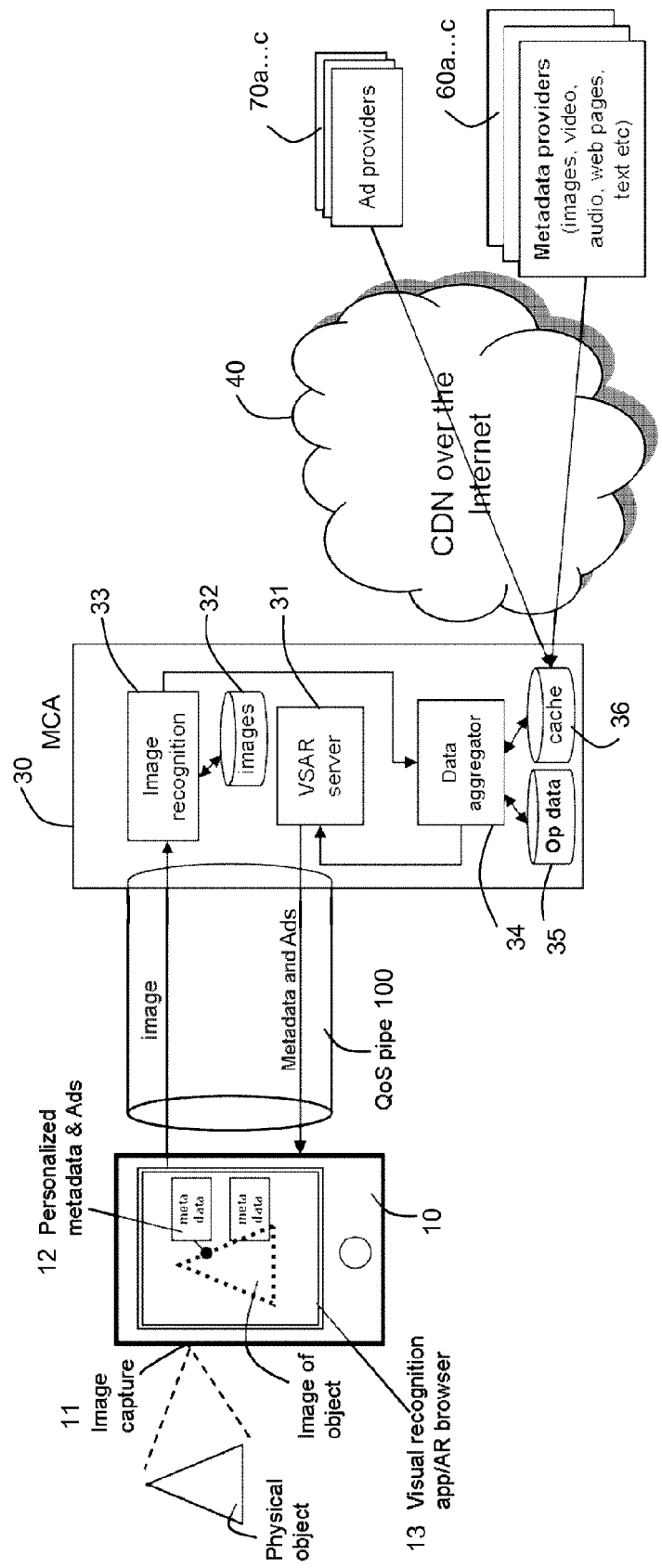
FIG. 3a shows a more detailed block diagram focusing on the visual service node within the telecommunications network if FIG. 1

FIG. 3a shows block diagram comprising the UE 10 the MCA 30, the Internet 40 of FIG. 1, an exemplary plurality of metadata server 60a, . . . , 60c and a further exemplary plurality of advertisement servers 70a, ..., 70c. The UE 10 comprises a camera 11, a display 12 and a VSAR application 13. The MCA 30 comprises the VSAR server 31 described above, and an image recognition (function) 33, an image cache 32, an aggregator (function) 34 and an operational data entity (database) 35 an a metadata cache 36 adapted for caching metadata and/or advertisements received over the internet 40. Further an exemplary metadata server 60a out of the plurality of servers 60a, ..., 60c depicted in FIG. 3a and an exemplary Ads server 70a out of the plurality of servers 70a, ..., 70c depicted in FIG. 3a are involved.

As described above, the VSAR server 31 is a server dedicated for a communication with the corresponding visual service application 13 of the UE 10. The VSAR server 31 is responsible for receiving visual search queries from the VSAR application 13, and for sending corresponding replies to the VSAR application. It maintains the connection between the VSAR application and redirects UE requests to appropriate functions within or associated to the MCA 30, e.g. to the image recognition (function) 33 and the data aggregator function 34.

The image recognition (function) 33 performs a recognition of an image captured by the UE 10 and transferred to the MCA 30 over the prioritized QoS pipe 100. Basically, the image data is compared to a plurality of images stored in the image data base 32 in order to identify a match with one of these images. More specifically, current visual search systems might adopt a feature based image matching approach. By representing images or objects using sets of local features, recognition can be achieved by matching features between the query image and candidate database image. Fast large-scale image matching is enabled using a so-called Vocabulary Tree (VT). Features are extracted from the database of images and a hierarchical k-means clustering algorithm might be applied to all of these features to generate the VT. Descriptors of the query image might be also classified through the VT and a histogram of the node visits on the tree nodes is generated.

The data aggregator (function) 34 binds together parts of data relevant to the search query and returns a set of personalized information (metadata and advertisements). Thereto the data aggregator uses data stored in the operational data entity 35 (comprising data as being described under FIG. 4), in the metadata and ads servers. Its main task is creating a corresponding set of metadata, e.g. a personalized, performing advertisement insertion. The aggregator might employ data mining techniques to get preferences (readiness to purchase a certain category of items via shopping history) of the subscriber. Characteristics of the subscriber could include for example demographical information, current location, current subscription type, current connectivity etc. Using the preferences, most relevant advertisements can be connected to the items being recognized. The metadata connected to the object being recognized might also be personalized based on preferences and characteristics of the subscriber.

As described under FIG. 1, a prioritization in the access is performed in response to a service registration or a service request. Thereto, a prioritized bearer or QoS pipe 100 is established between the UE 10 and the MCA 30. To further ensure an assured level of QoE with respect to providing the VSAR service a content data network CDN may be used in the Internet to accelerate metadata and Ad delivery.

The physical object captured by the camera 11 e.g. a product in physical store is typically located in a geographical area where the operator operating the MCA 30 is present. The VSAR service provider providing the VSAR services to the end users 10 might be the same operator or any other entity.

Figure 3B:
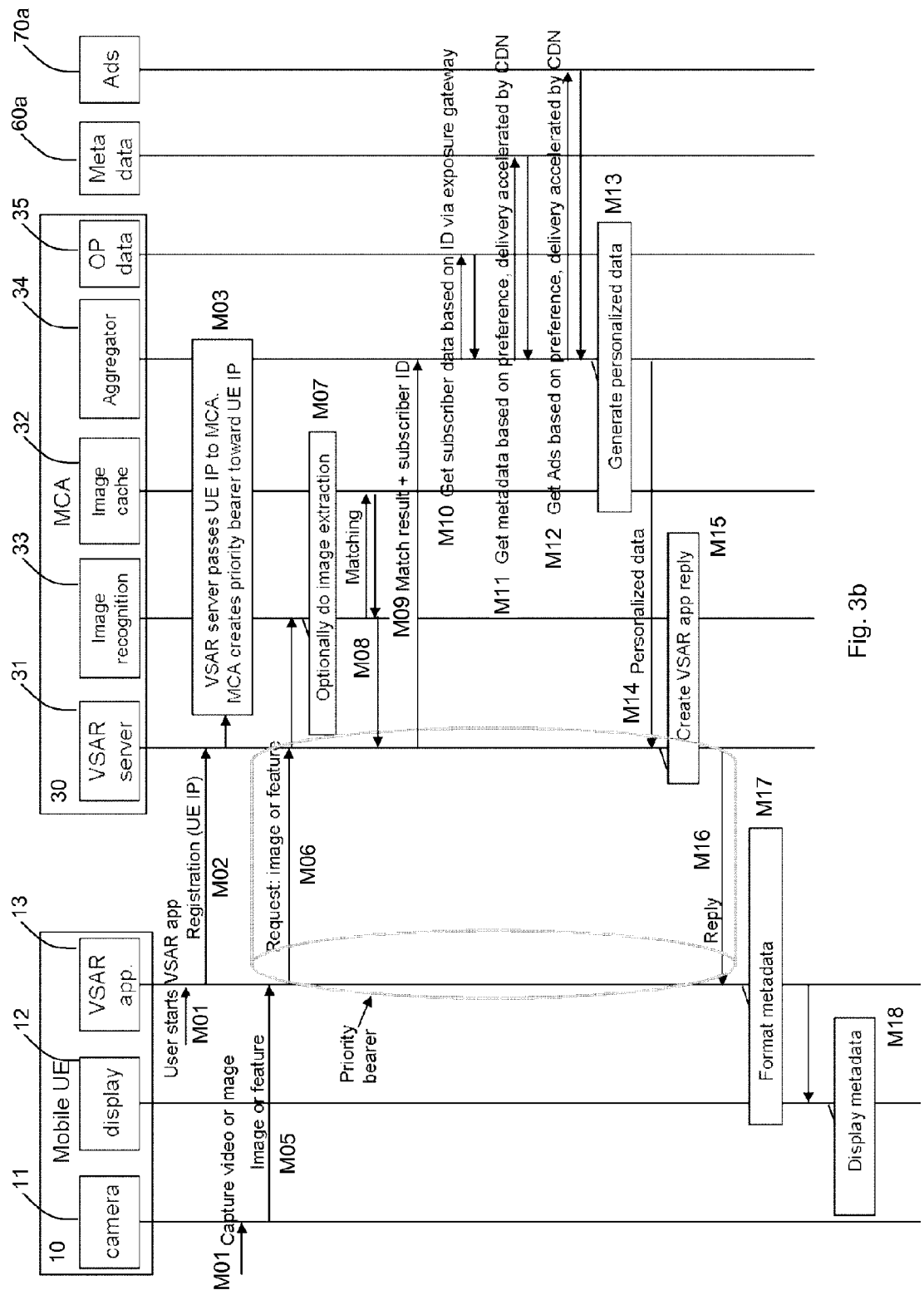
FIG. 3b shows a more detailed exemplary sequence of steps performed by the visual service node sequence for performing the visual service.

FIG. 3b shows a flow diagram illustrating an exemplary interaction between the UE 10 and the MCA 30, wherein the UE 10 comprises the camera 11, the display 12 and the VSAR application 13, and the MCA 30 comprises the VSAR server 31, the image recognition (function) 33, the image cache 32, the aggregator (function) 34 and the operational data entity (database) 35. Further an exemplary metadata server 60a out of the plurality of servers 60a, ..., 60c depicted in FIG. 3a and an exemplary Ads server 70a out of the plurality of servers 70a, ..., 70c depicted in FIG. 3a are involved.

In a first step M01, the VSAR application 13 in the UE 10 is started.

In a second step M02, a corresponding message is sent to the VSAR server 31, e.g. a registration message.

In a third step M03, the VSAR serve r31 passes the IP address of the UE—UE IP—to an appropriate MCA function to ensure a certain level of QoS for a bearer to the UE (according to an operator policy), e.g. by creating a priority bearer to the UE 10.

In a fourth step M04, an image of a physical object is captured by the UE 10, e.g. by means of the camera 11 of the UE.

In a fifth step M05, (as an internal message in the UE), image data is provided to the VSAR application 13.

In a sixth step M06, if the QoS was setup in the third step M03, the image data is sent (e.g. over the corresponding priority connection) to the VSAR server 31. The subscriber identity might be retrieved by the VSAR server 31 from the MCA function.

In an optional seventh step M07, a conversion from image data to feature data is performed (e.g. in the VSAR server), especially if not being performed earlier in the UE 10.

In an eighth step M08, a matching of the image data is performed by the image recognition function 33.

The following subsequent steps M09-M14 refer to an (optional) personalized VSAR service provision.

In a ninth step M09, a result of the matching is passed to the aggregator function 34 along with the identity of the subscriber (e.g. MSISDN).

In a tenth step M10, the aggregator function 34 gets relevant operator data on the subscriber (e.g. from an exposure gateway accessing the operator data 35); so-called data mining techniques might be applied to get user preferences.

In an eleventh step M11, e.g. based on user preferences and characteristics, relevant metadata is fetched e.g. from the 3rd party provider 60a or from a local storage of metadata, or from both of these sources (in case the metadata is fetched from the Internet, it might be accelerated using the content data network CDN).

In a twelfth step M12, e.g. based on the user preferences and characteristics, relevant advertisements are fetched from in manner similar to step above.

In a thirteenth step M13, the aggregator function 34 generates a corresponding personalized reply based on data from steps 11 and/or 12.

In a fourteenth step M14, the personalized data is passed to the VSAR server 31.

In a fifteenth step M15, the VSAR server 31 creates a reply for the UE VSAR application 13; the reply comprising e.g. so-called metadata information.

In a sixteenth step M16, the reply is sent over the QoS enabled connection (e.g. prioritized bearer) to the UE 10.

In a seventeenth step M17, the VSAR application 13 converts the reply data into suitable format e.g. to be displayed on the UE display 12.

In an optional eighteenth step M18, the metadata might be presented to the user in a convenient visual manner e.g. as an overlay over the image of the physical object on the UE screen. Alternatively or additionally such data might be presented as voice information.

In the above-described embodiments, the VSAR server 31, the image recognition function 33, the data aggregator 34 and databases of images and operator data 23 and 35 as well the cache 36 for caching the data of the plurality of metadata providers 60a-60c and/or advertisement providers 70a-70c are by way of example integrated in the MCA 30, that might consist of one physical nodes or of a plurality of physical nodes communicating with each other. In the following FIG. 6 and FIG. 7 exemplary alternatives are described.

In the following FIG. 4, exemplary functions and interactions performed by the data aggregator 34 are described in more details. As discussed in previous sections, the core function of the data aggregator is to put together several pieces of data associated to the subscriber request based on subscriber characteristics, operator policies, etc.

Figure 4:
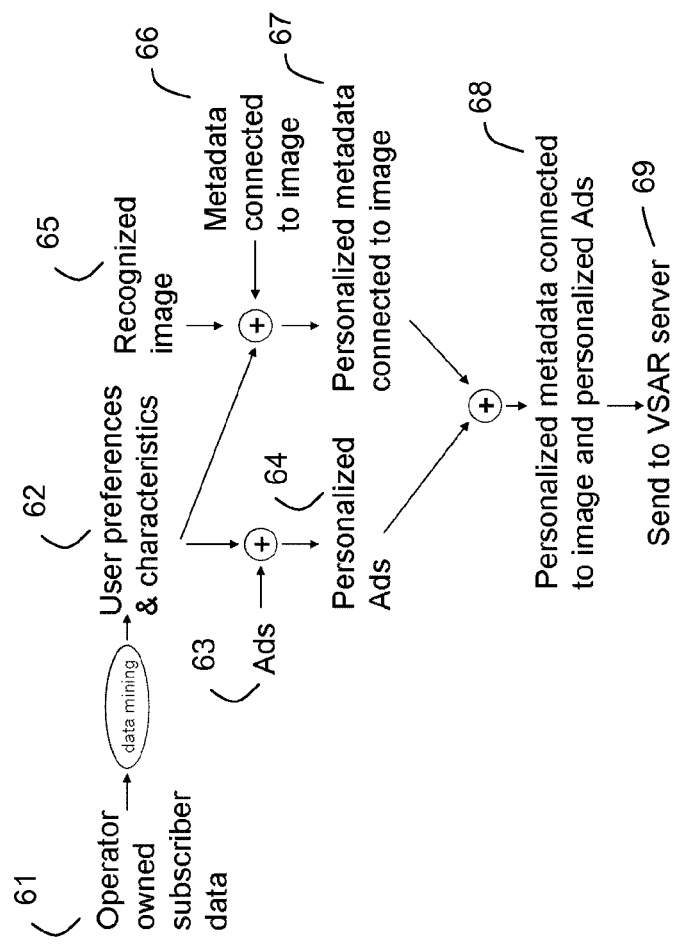
FIG. 4 shows exemplary functions of a data aggregator of the visual service node.

According to the example of FIG. 4, operator-owned subscriber data 61 is transformed to user preferences and/or characteristics 62 e.g. by means of data mining techniques (as discussed usage of the data 61 might be dependent on a user consent). Based thereon, metadata 66 associated to a recognized image 65 that is associated to the request of the subscriber is used to create personalized metadata 67. Additionally or alternatively thereto, personalized advertisements 64 are selected from a set of (general) advertisements 63 as a function of the user preferences and/or characteristics 62. The personalized advertisements might comprise one or a plurality of advertisements associated to the items being recognized that are identified of having certain relevance with respect to the user. A response message 68 comprising the personalized advertisements 64 and/or the personalized metadata is created. In a subsequent transmission function 69, this message is transmitted to the UE 10.

The operator-owned subscriber data 61 might comprise a plurality of subscriber data sets. In the following exemplary sets are listed:

Communication information set comprising capability information and/or parameters about e.g. voice chat, voice mail, SMS/MMS, conference, IM, WAP-Push and USSD;

Content set comprising capability information and/or parameters e.g. about ringtone, ringback video, photo, video;

Security set comprising capability information and/or parameters e.g. about fraud protection, signing certificate, and encryption;

Context set comprising capability information and/or parameters e.g. about presence, location device capabilities and status;

Payment information set comprising information about carrier billing, balance, credit, and whole sale;

Data connectivity set comprising information and/or parameters e.g. about Push, Quality of Service, bulk update, data aggregator;

User data set comprising e.g. a user profile, (personal) phonebook, calendar, browsing history, and information about mobile social networking;

Identity information set e.g. comprising MSISDN, IP Address(es), SIP identity, and information about authentication, aliasing and privacy; and Device management information set comprising information e.g. about provisioning and monitoring.

As mentioned, the aggregator might employ so-called data mining techniques to get the user preferences, e.g. comprising a readiness or addiction to purchase a certain category of items via shopping history, any recorded history events and/or subscriber characteristics. Such data might be used in dependency to a subscriber consent (i.e. the subscriber defines if and which data associated to himself may be used by the data aggregator). Such consent might be stored as well in the operator-owned subscriber data 61, and/or might be requested from the used if required.

Figure 5:
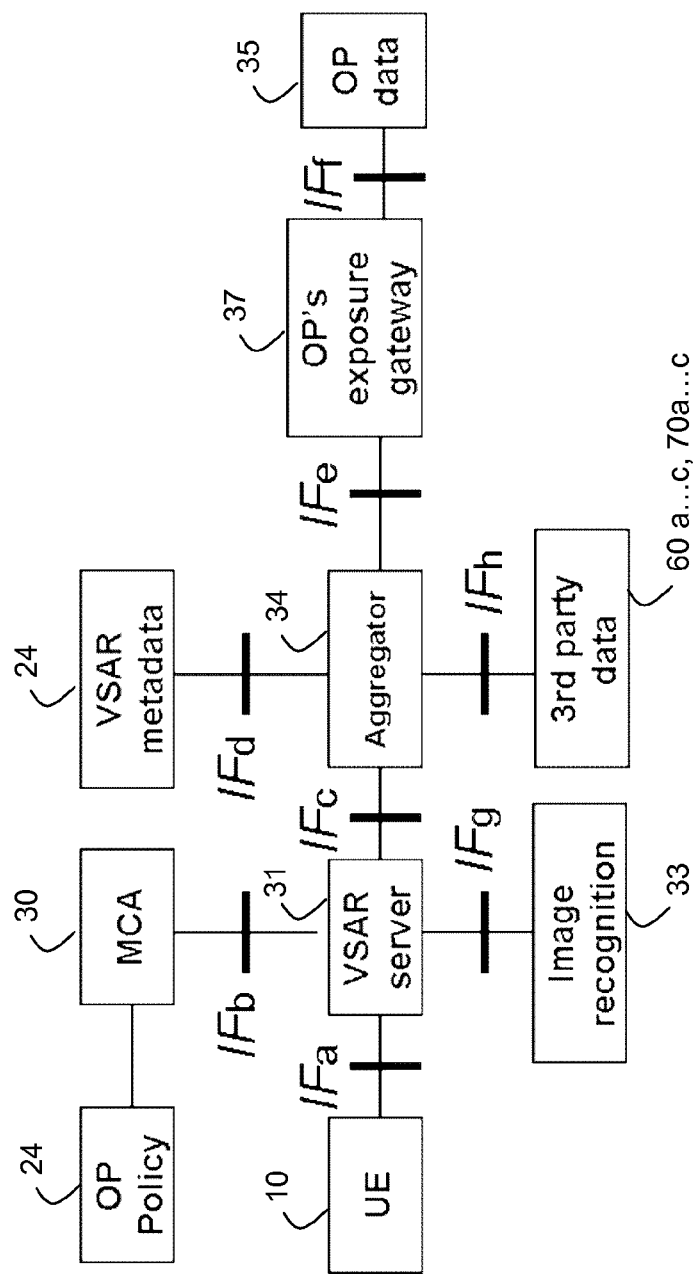
FIG. 5 shows exemplary interfaces between selected functions associated to the visual service.

The following FIG. 5 illustrates exemplary entities or functions described above and corresponding interfaces:

The first interface IFa couples the VSAR application 13 in the UE 10 and the VSAR server 31. A main purpose of this interface is to receive VSAR requests from the application and transmit corresponding answers. Typical VSAR applications might use the HTTP protocol, but other protocols might be used as well.

The second interface IFb is an interface for transmitting a QoS request for a session and also for passing the identity of the subscriber (e.g. MSISDN) to the VSAR server 31 (this interface might be internal with respect to the MCA 30).

The third interface IFc passes a recognized image to the aggregator 34 (this interface might be internal with respect to the MCA 30)

The fourth interface IFd is an interface via which the aggregator 34 gets metadata corresponding to a recognized image. The metadata might be stored in the MCA or at an external site (e.g. a server in the internet). The data format could be in form of image, video, audio, text, web page, animation etc.

The fifth interface IFe is an interface via which the aggregator function 34 might tap into the operator's subscriber information, e.g. communication context, user data, network information etc as listed above.

The sixth interface IFf is an implementation specific interface. This interface might consist of a plurality of interfaces to different sources of operator's subscriber data.

The seventh interface IFg is an interface via which the VSAR server 31 sends image (or features) to the recognition system and gets back a code of the found image or error if the image was not recognized.

The eighth interface IFh is an interface via which the aggregator 34 might get extra data associated to the recognized image, such as metadata or advertisements maintained by metadata providers and/or advertisement providers. The data format could be in form of; image, video, audio, text, web page, animation etc.

Figure 6:
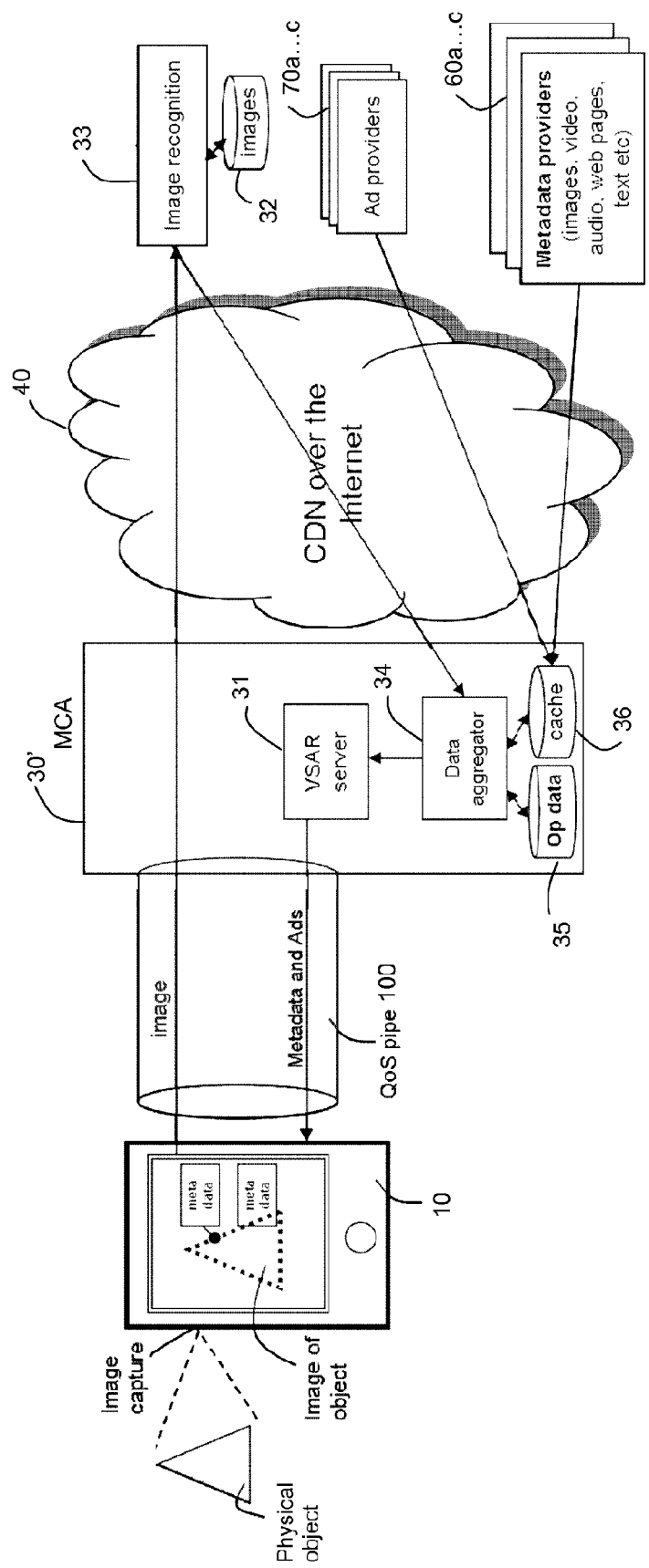

FIG. 6 shows an exemplary architectural variant to FIG. 3a, wherein differently to FIG. 3a, the image recognition function 33 is performed by in the internet instead of being performed in the mobile network (MCA). Such embodiment might be preferable in case that an operator is not capable and or is not interested in performing an image recognition inside a corresponding MCA 30'. Thus, a corresponding first variant MCA 30' might not comprise the image recognition function 33 and the image data base 32. Instead, the first variant MCA 30' comprises a function to communicate with a corresponding image recognition server over the internet in order to obtain the matching result to be used by the data aggregator.

Figure 7:
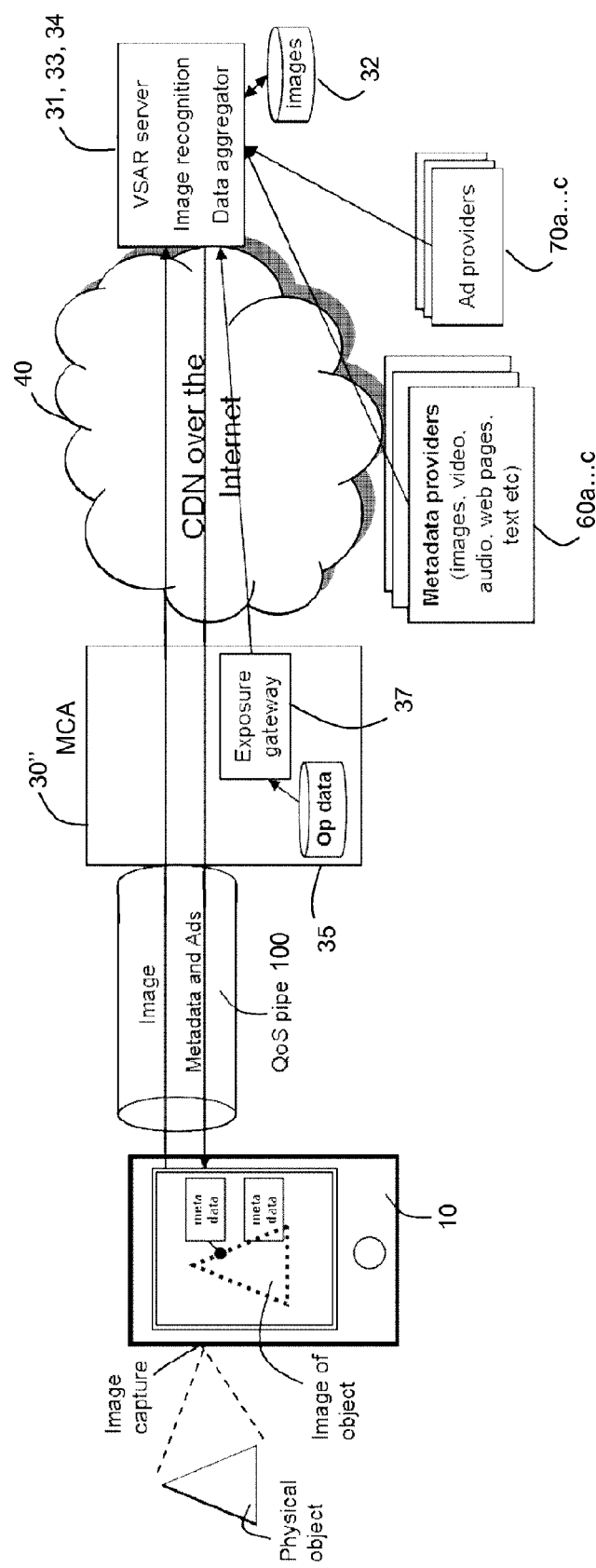

FIG. 7 shows an exemplary architectural variant to FIG. 3a, wherein almost all the VSAR functions (VSAR server, image recognition, data aggregator) are performed in the Internet. A corresponding second variant MCA 30", in addition to establishing the QoS handling (priority bearer) between the UE 10 and the mobile network, might perform operator data exposure (and prioritization) to the VSAR functions performed in the internet. In order to ensure an overall certain level of QoE, an appropriate acceleration of the result to the MCA 30" and further an acceleration of the metadata and advertisements to the internet based data aggregator might be ensured by certain functions connected to the internet, e.g. a so-called content data network the CDN.

The invention enables the operator to enter a new value chain and provide advanced visual search and augmented reality services. A new revenue stream can be created by hosting functions supporting VS and AR (VSAR server, image recognition and aggregator) in the MCA. The operator can sell VS and AR services to those firms and companies who rely on VS and AR technology for their business and are geographically located in a area where the operator has infrastructure e.g. an mobile operator providing service in a certain city is able to offer a VS and AR service to a real estate company in this city which might uses AR to advertise houses/apartments fro sale. The invention also enables operators to earn revenue based advertisement spot reselling of AR space to 3rd party metadata providers and advertisement providers by performing advertisement insertion based on subscriber information knowledge. Finally, the invention allows to provide these services at a certain level of QoE.

The invention claimed is:

1. A method for improving quality of experience (QoE) for a visual service associated to a mobile user equipment (UE) in a communications network, the communications network comprising a mobile network, the method comprising:
    receiving at a service node within the mobile network a message indicative of a request of the UE associated to the visual service, wherein the request comprises data indicative of an image associated to an item captured by a camera associated to the UE;
    obtaining the network address of the UE;
    initiating an adaptation of a quality of service (QoS) level for a treatment of data traffic associated with the visual service between the UE and the mobile network in response to the obtained network address, wherein the adaptation of QoS level comprises establishing a dedicated bearer for the visual service, wherein, prior to initiating the adaptation of the QoS level, the service node communicates with a policy server to determine if initiating an adaptation of a quality of service level should be performed towards the UE, wherein the policy server communicates with a gateway node within the mobile network responsible for establishing the adaptation of the quality of service level towards the UE, wherein the adaptation of the QoS level comprises upgrading a bearer level QoS of a default bearer established between the UE and the gateway node, by increasing a guaranteed bit rate, a maximum bit rate, or an allocation and retention priority in addition to the dedicated bearer;
    performing an image recognition associated to the captured item; and
    in case that the image recognition is successful: i) retrieving item information from one or a plurality of data servers; ii) generating a visual search response comprising specific information with respect to the captured item; and iii) transmitting the visual search response to the UE through the dedicated bearer.

2. The method of claim 1, wherein, prior to initiating the adaptation of the quality of service level, the service node initiates performing an authentication in order to determine if the visual service shall be provided or not provided to the UE.

3. The method of claim 1, wherein the one or the plurality of data servers are connected by means of a data packet network, and wherein the service node performs a data packet network communication in order to obtain the item information.

4. The method of claim 1, wherein the service node retrieves subscriber information associated to the UE from an operator data base to be used for generating the specific information in dependency of the subscriber information, wherein the operator data base keeps stored at least one of: subscription information with respect to the visual service, subscriber preferences, subscriber status, subscriber's consent to use certain user information, information associated to previous subscriber's service requests.

5. The method of claim 4, comprising generating in the service node the specific information sending a request to the one or the plurality of data servers, the request comprising a subscriber's preference information based on the subscriber information, and receiving from the one or the plurality of data servers the item information associated to from the preference information.

6. The method of claim 5, wherein the item information received from the one or the plurality of data servers comprises receiving at least one of: metadata information and one or a plurality of advertisement messages, to be output at a display of the UE, by means of a visual overlay to the captured image, or by means of voice information.

7. The method of claim 1, wherein visual service is a visual search and augmented reality service.

8. A computer program product comprising a non-transitory computer readable medium storing a computer program loadable into a processing unit of a service node, the computer program comprising code adapted to cause the service node to execute the method of claim 1.

9. A service node configured for supporting a visual service associated to a mobile user equipment (UE) in a mobile network, the service node comprising:
    a user interface configured for receiving a message indicative of a request of the UE associated to the visual service, the message comprising data indicative of an image associated to an item captured by a camera associated to the UE, and for transmitting a corresponding response;
    a processor configured for processing the request of the UE, and to initiate an adaptation of a quality of service (QoS) level for a treatment of data traffic associated with the visual service between the UE and the mobile network wherein the adaptation of QoS level comprises establishing a dedicated bearer for the visual service, wherein, prior to initiating the adaptation of the QoS level, the service node communicates with a policy server to determine if initiating an adaptation of a quality of service level should be performed towards the UE, wherein the policy server communicates with a gateway node within the mobile network responsible for establishing the adaptation of the quality of service level towards the UE, wherein the adaptation of the QoS level comprises upgrading a bearer level QoS of a default bearer established between the UE and the gateway node, by increasing a guaranteed bit rate, a maximum bit rate, or an allocation and retention priority in addition to the dedicated bearer; and
    an image recognition processor configured for:
    i) performing an image recognition of image data received by the user interface, to determine if the image data matches to stored image data;
    ii) retrieving item information from one or a plurality of data servers in case that the image recognition is successful;
    iii) generating the corresponding response comprising specific information with respect to the captured item; and
    iv) transmitting the response to the UE through the dedicated bearer.

10. The service node of claim 9, further comprising an image aggregator processor adapted to retrieve item information from one or a plurality of data servers in case that the image recognition was successful.

11. The service node of claim 10, further comprising an interface to a policy server adapted to transmit a request indicative of the adaptation of a quality of service level, to be enforced by a gateway node coupled to the policy server.

* * * * *